United States Patent [19]

Fukushima et al.

[11] Patent Number: 5,114,531
[45] Date of Patent: May 19, 1992

[54] METHOD OF PRODUCING MASKS FOR ROM TYPE OPTICAL RECORDING CARDS AND METHOD OF INSPECTING MASKS

[75] Inventors: Yoichi Fukushima; Minoru Fujita; Yuji Kakinuma, all of Tokyo, Japan

[73] Assignee: Kyodo Printing Co., Ltd., Tokyo, Japan

[21] Appl. No.: 582,853

[22] PCT Filed: Apr. 12, 1989

[86] PCT No.: PCT/JP89/00393
§ 371 Date: Oct. 12, 1990
§ 102(e) Date: Oct. 12, 1990

[87] PCT Pub. No.: WO89/09990
PCT Pub. Date: Oct. 19, 1989

[30] Foreign Application Priority Data

Apr. 13, 1988 [JP] Japan .................. 63-090953
Dec. 23, 1988 [JP] Japan .................. 63-325174

[51] Int. Cl.⁵ ............................ B44C 1/22; C23F 1/02
[52] U.S. Cl. .................. 156/659.1; 156/626; 156/650; 156/656; 156/902; 156/643; 430/321; 430/323
[58] Field of Search .............. 156/626, 627, 650, 656, 156/659.1, 661.1, 665, 901, 902; 430/5, 313, 318, 321, 323, 329; 356/388, 394, 433

[56] References Cited

U.S. PATENT DOCUMENTS

| 4,724,043 | 2/1988 | Bergendahl et al. | 156/643 |
| 4,726,006 | 2/1988 | Benne et al. | 156/643 X |

FOREIGN PATENT DOCUMENTS

| 59-38947 | 8/1982 | Japan . |
| 59-40338 | 8/1982 | Japan . |
| 61-03339 | 6/1984 | Japan . |
| 61-80631 | 9/1984 | Japan . |
| 61-80632 | 9/1984 | Japan . |
| 0188757 | 2/1985 | Japan . |
| 0240452 | 10/1986 | Japan . |

Primary Examiner—William A. Powell
Attorney, Agent, or Firm—Martin A. Farber

[57] ABSTRACT

A method of producing a plurality of masks which are used when ROM type data are written in an optical recording medium for ROM type optical recording cards. The method is practiced by way of steps of producing a mother mask having a preformatting pattern, next, transcribing the preformatting pattern for the mother mask, next, producing a master mask having a required optical recording pattern written therein and next, producing a working mask from the master mask. When the preformatting pattern is prepared in a writable type, writing or inspecting of the master mask or inspecting of the working mask or mother mask can be achieved using a writing/reading apparatus for writable type optical recording cards.

7 Claims, 7 Drawing Sheets

METHOD OF PRODUCING MASKS FOR ROM TYPE OPTICAL RECORDING CARDS AND METHOD OF INSPECTING MASKS

TECHNICAL FIELD

The present invention relates to a method of producing masks which are used when optical recording mediums, particularly, ROM type optical recording cards are produced.

In recent years, cards each having various informations recorded therein have been widely used in the form of an ID card, a cash card, a bank card or the like. Masks of which production is carried out in accordance with the present invention are used for producing such ROM type optical recording cards.

BACKGROUND ART

With such kind of cards, it is required that various kinds of informations such as data concerning individual person, data concerning a company from which the cards are issued or the like data are recorded therein. In the earlier age, these informations are recorded in the form of visual characters or symbols. In the later age, they are recorded in the form of electrical signals using a magnetism. With the conventional recording means as mentioned above, it is required to take adequate measures for preventing them from being falsified or altered as well as for an increased quantity of informations.

To meet the requirement, an optical recording card to which a laser technology is applied has been developed lately. This optical recording card is such that it includes an information recording medium (optical recording medium) in which an optical reflective surface is involved. The optical reflective surface has a number of data pits formed thereon of which optical reflectivity is defferent from each other so that they are detected using a laser light on the basis of their differential reflectivity so as to allow informations in the optical recording card to be read therefrom.

The optical recording medium requires a data pit pattern for expressing data, a plurality of track guide grooves for tracking at the time of writing and reading data and a preformatting pattern indicative of addresses by which positions assumed by each sector on each track, status of usage or the like factor are represented. These preformatting pattern and data pit pattern are formed in such a fashion that data can be previously written in the optical recording medium but they can not be erased therefrom by any means.

One of methods of reading data in the optical recording medium is practiced in such a manner that a comparison is made among reflected lights with respect to their intensity. Further, one of methods of producing optical recording mediums suitable for the foregoing method is such that by employing the photographic etching technique a preformatting pattern and a data pit pattern are worked in a mask in the form of a pattern comprising a reflective metal layer so as to allow a intensity of reflectivity to be varied from position to position. In practice, a working mask is prepared when a number of optical recording mediums are produced in accordance with a contact printing process or the like method on the factory base using a master mask including a preformatting pattern and a data pit pattern. Now, to facilitate understanding of the present invention, a series of steps of producing a conventional photomask employable for producing the foregoing masks will be described below with reference to FIG. 6.

Figure 6:
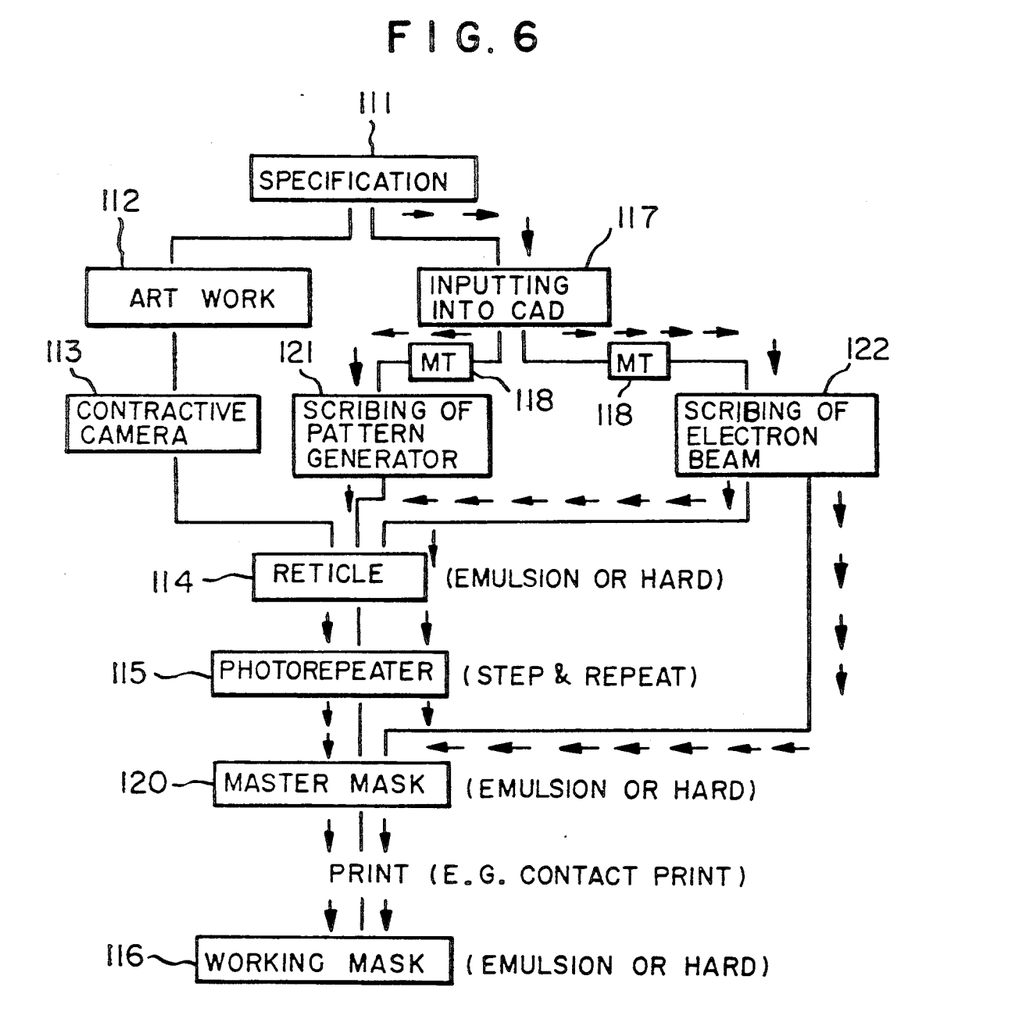
FIG. 6 is a block diagram illustrating steps of producing a working mask for ROM type optical recording cards.

In detail, a negative is produced using an art work 112 on the basis of a specification 111 having a number of items on the optical recording medium described thereon and the thus produced negative is contracted by a contractive camera 113 so that an emulsion type or hard type reticle (intermediate mask) 114 is produced.

Then, the number of negatives is increased while the reticle (intermediate mask) 114 is contracted to an extent of 1/10 or 1/5 of the orginal figure having sizes 10 to 5 times as large as the negative scribed on the reticle (intermediate mask) 114 by operating a photorepeater 115 so that a master mask 120 is produced. A working mask 116 is obtained by printing the master mask 120.

Alternatively, a magnetic tape 118 is produced by inputting data thereinto with the aid of CAD as represented by reference numeral 117. Then, while the magnetic tape 118 is used as an inputting medium, a reticle 114 is produced by allowing the preformatting pattern to be automatically exposed to a light beam on the high resolution plate (HRP) using a pattern generator 121. Thereafter, a working mask 116 is obtained by way of the steps as mentioned above.

Otherwise, while the magnetic tape 118 is used as an inputting medium, a master mask 115 is produced using an electron beam exposing apparatus 122 so that a working mask 116 is produced also by way of the steps as mentioned above.

DISCLOSURE OF THE INVENTION

Since the content of informations to be stored in a ROM type optical recording medium differs from case to case, there is a need of taking an adequate measure for satisfactorily meeting the respective cases. When a number of ROM type optical recording mediums are produced, it is necessary to produce a master mask having individual data pit for every ROM information data on the basis of specifications set for the optical recording card. To this end, an expensive master mask has been heretofore produced for every ROM information data, resulting in the master mask for ROM type optical recording mediums being produced at an expensive cost. Hitherto, when a plurality of masks for ROM type optical recording mediums are produced, an electron beam generator, a pattern generator or the like apparatus are employed as exposing means. However, as a quantity of informations is increased, a time required for data processing and a time required for a step of exposing are elongated and moreover a long period of time is required also for a step of inspecting a master mask, causing the master mask to be produced at an expensive cost. It should be added that the aforementioned method using the art work in that way is very complicated in practical application.

The present invention has been made with the foregoing background in mind and its object resides in providing a method of producing a plurality of masks suitable for producing ROM type optical recording mediums at an inexpensive cost.

To accomplish the above object, there is provided according to a first aspect of the present invention a method of producing a working mask for ROM type optical recording cards each having the same preformatting pattern and data pit pattern as writable type optical recording cards, wherein the method comprises steps of producing a mother mask having the preformatting pattern, producing a master mask base board on which the preformatting pattern is transcribed, producing a master mask by forming a number of data pits on the master mask base board in correspondence to the data pit pattern by irradiating a laser beam thereto in response to a control signal derived from the preformatting pattern, and printing the master mask to produce the working mask.

Further, according to a second aspect of the present invention there is provided a method of producing a mother mask for ROM type optical recording cards each having the same preformatting pattern as writable type optical recording cards, wherein the method comprises steps of coating a resist on a hard mask blank, next, exposing the resist to a light beam in accordance with the configuration of the same preformatting pattern as the writable type optical recording cards, next, developing the resist, next, etching the hard mask blank, and next, removing the resist from the hard mask blank.

Further, according to a third aspect of the present invention there is provided a method of producing a master mask for ROM type optical recording cards each having the same performatting pattern and data pit pattern as writable type optical recording cards, wherein the method comprises steps of coating a resist on a master mask base board having a metal layer formed thereon, next, exposing the resist to a light beam while a mother mask for ROM type optical recording cards each having the same preformatting pattern as writable type optical recording cards is superposed on the resist, next, developing the resist, next, etching the metal layer on the master mask base boards, next, removing the resist from the master mask base board, next, forming an optical recording layer on the metal layer of the master mask base board, next, writing the date pit pattern by forming a number of data pits on the optical recording layer in correspondence to the data pit pattern by irradiating a laser beam thereto in accordance with the same preformatting pattern as the writable type optical recording cards, next, etching the master mask base board using as a mask the optical recording layer with the data pits formed thereon in correspondence to the data pit pattern, and next, removing the optical recording layer from the master mask base board.

Further, according to a fourth aspect of the present invention there is provided a method of producing a master mask for ROM type optical recording cards each having the same preformatting pattern and data pit pattern as writable type optical recording cards, wherein the method comprises steps of coating a resist on a master mask base board having a metal layer of metal having a low melting point formed thereon, next, exposing the resist while a mother mask for ROM type optical recording cards each having the same preformatting pattern as the writable type optical recording cards is superposed on the resist, next, developing the resist, next, etching the metal layer of metal having a low melting point formed on the master mask base board, next, removing the resist from the master mask base board, and next, writing the data pit pattern by forming a number of data pits on the metal layer of metal having a low melting point in correspondence to the data pit pattern by radiating a laser beam thereto in accordance with the same preformatting pattern as the writable type optical recording cards.

Further, according to a fifth aspect of the present invention there is provided a method of inspecting a plurality of masks each having the same preformatting pattern and data pit pattern as writable type optical recording cards, wherein the data pit pattern for the masks is read by a reading/writing apparatus for inspecting the masks while the reading/writing apparatus for the writable type optical recording cards is controlled in response to a control signal derived from the preformatting pattern, and decoded ROM information data are compared with ROM information data prepared on the basis of specifications set for the ROM type optical recording cards using a computor.

Furthermore, according to a sixth aspect of the present invention there is provided a method of inspecting ROM type optical recording cards each having the same preformatting pattern and data pit pattern as writable type optical recording cards, wherein the data pit pattern for the ROM type optical recording cards is read by a reading/writing apparatus for inspecting the ROM type optical recording cards while the writing/reading apparatus for the writable type optical recording cards is controlled in response to a control signal derived from the preformatting pattern, and decoded ROM information data are compared with ROM information data prepared on the basis of specifications set for the ROM type optical recording cards using a computor.

Other objects, features and advantages of the present invention will become more readily apparent from a reading of the following description which has been made with reference to the accompanying drawings.

BRIEF DESCRIPTION OF THE DRAWINGS

The present invention will be illustrated in the following drawings in which:

FIGS. 2(a) to (g) are schematic view illustrating a step of producing a mother mask, respectively.

FIGS. 3(a) to (g) are schematic view illustrating a step of producing a master mask base board, respectively.

FIGS. 4(a) to (g) are schematic view illustrating a step of producing a master mask, respectively.

FIGS. 5(a) to (d) are schematic view illustrating another step of producing a master mask, respectively.

BEST MODE FOR CARRYING OUT THE INVENTION

Now, the present invention will be described in a greater detail hereinafter with reference to the accompanying drawings which illustrate preferred embodiments thereof.

The working mask which has been produced by transcribing a master mask in accordance with a contact printing process or the like method is employed as a mask which is employable for the purpose of producing a number of ROM type optical recording cards in a mass production system.

Firstly, the present invention will be described below with reference to FIG. 1 which illustrates a series of steps of producing a number of ROM type optical recording cards using the master mask for the ROM type optical recording cards.

(1) A hard mask having a preformatting patten for writable type optical recording cards is produced. The preformatting pattern comprises a control pit pattern of which control pits are prepared in the form of guides, track numbers or the like (step of producing a mother mask as shown in FIG. 1(a)).

Figure 1:
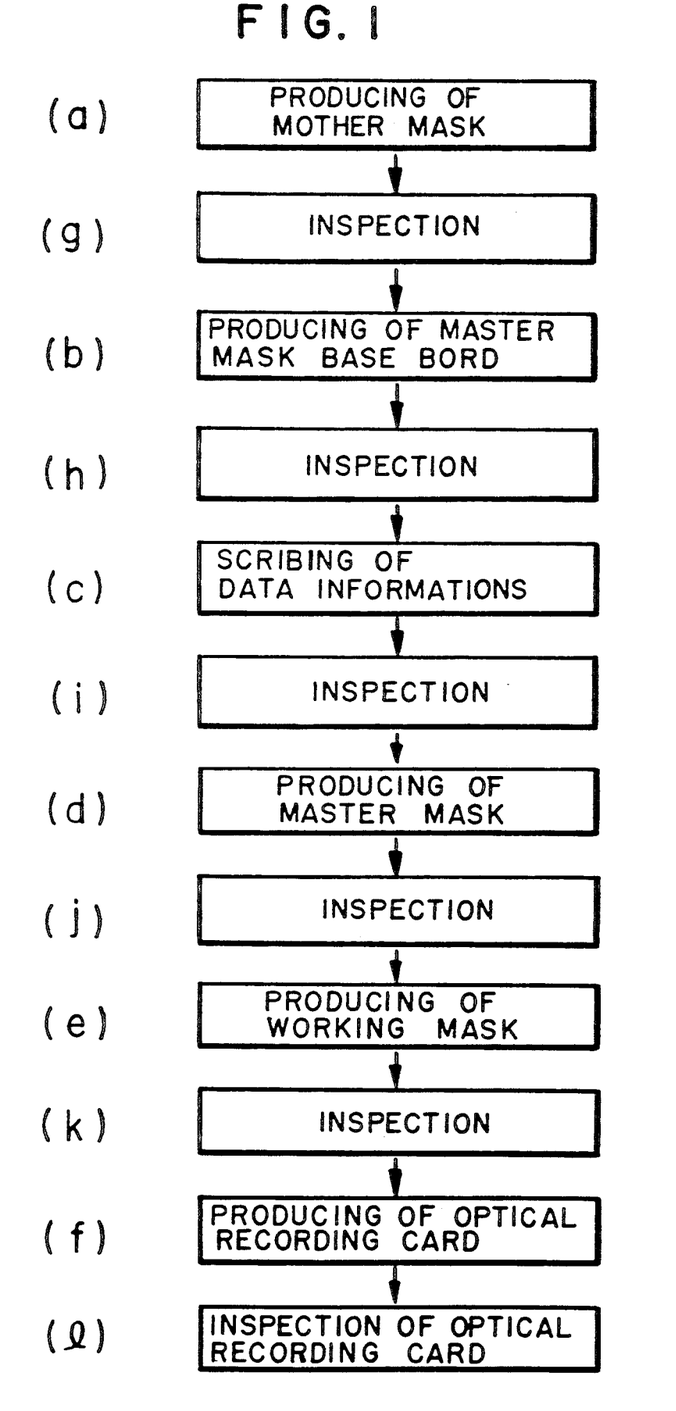
FIG. 1 comprises blocks a-1 which constitute a block diagram illustrating a series of steps of producing ROM type optical recording cards using a master mask for the ROM type optical recording cards.

(2) Next, the preformatting pattern which has been formed on the mother mask is transcribed to a master mask blank (with a layer having a high reflectivity formed on a base board such a glass plate or the like) in accordance with an etching process or the like method so that a base board usable for the master mask is produced (step of producing a base board for the master mask as shown in FIG. 1(b)).

(3) Next, a data pit pattern is scribed on the master mask base board having the preformatting pattern transcribed thereto by radiating a laser light in such a manner that a writing/reading apparatus for writable type optical recording cards is controlled while performing a tracking operation and a focussing operation in response to a control signal derived from the preformatting pattern and ROM information data are encoded utilizing a software for the writable type optical recording cards (step of scribing ROM information data as shown in FIG. 1(c)).

(4) Next, a master mask is produced using the data bit pattern while the master mask base board is processed in the form of a pattern by developing, etching or the like process (step of producing a master mask as shown in FIG. 1(d)).

(5) Next, a working mask is produced by transcribing the preformatting pattern and the data pit pattern from the master mask (step of producing the working mask as shown in FIG. 1(e)).

(6) Next, ROM type optical recording cards are produced using the working mask (step of producing ROM type optical recording cards as shown in FIG. 1(f)).

As required, a step of inspecting the preformatting pattern and the data pit pattern (as shown in FIG. 1(g) to FIG. 1(l) is added to each of the foregoing steps so that a quality controlling operation is performed during the respective steps.

The steps of inspecting (as shown FIG. 1(g) to FIG. 1(l) are performed in such a manner that the writing/reading apparatus for writable type optical recording cards is controlled to read the data pit pattern while performing a tracking operation and a focussing operation in response to a control signal derived from the preformatting pattern and decoded data are compared with ROM information data prior to encoding with the use of a computor for the purpose of inspection.

Figure 2:
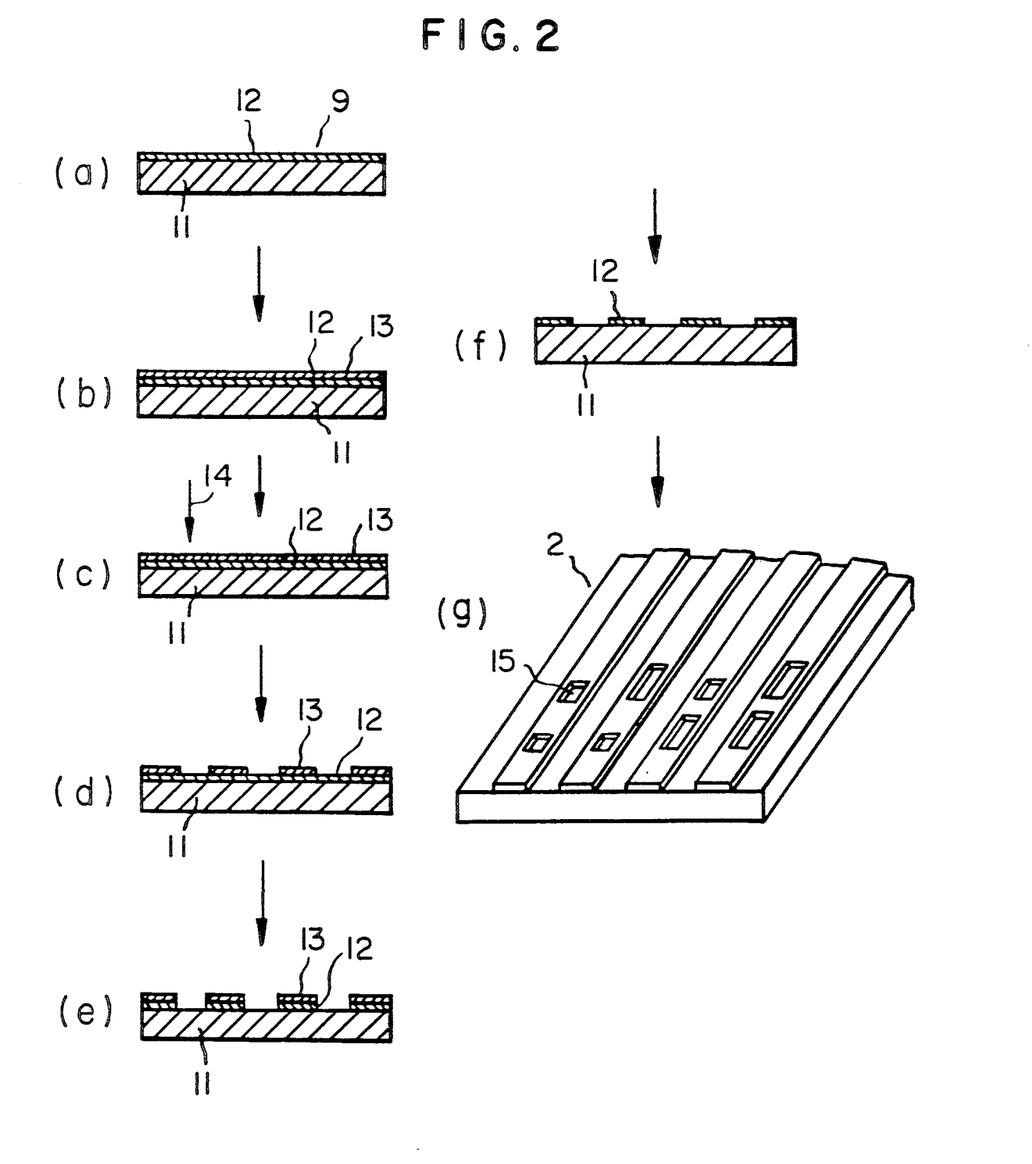

Secondly, the present invention will be described below with reference to FIG. 2 which illustrates a series of steps of producing a mother mask.

(1) First, a hard mask blank 9 is prepared. A chromium mask blank having a low reflectivity, e.g., UL-COAT PFL-5009 (S) L produced by Ulvac Coating Corporation, having a light shielding layer 12 of chromium or the like metallic material formed on a base board 11 of glass or the like material is used for the hard mask blank 9 (see FIG. 2(a)).

As other type of hard mask material comprising glass material (representative of the base board 11), soda lime blue (blue plate glass), sode lime white (white plate glass), glass having a low expansion coefficient, synthetic silica or the like material are employable for the same purpose. As material other than glass, a material in the form of a plate having an excellent surface smoothness made of polymethylmethacrylate, polymethylmethacrylate, polyethylenterephthalate, epoxy or the like resin is employable. It is preferable from the viewpoint of easy usage that the hard mask board has a thickness in the range of 0.05" to 0.09".

Further, a material for the light shielding layer is selected on the basis of a property of adhesiveness to the base board 11, a property of light shielding and an aptitude to etching. Typically, a single-layered structure of Cr, a multi-layered structure of Cr/CrxOy or CrxOy/Cr/CrxOy, a metal layer of Al, Ni, Co, Ag, Au, Cu, Ti or the like metallic material, a chalcogenide based metal layer and an alloy layer comprising the metal layer and the chalcogenide based metal layer as mentioned above are employable form the viewpoint of a property of light shielding and a high reflectivity. Particularly, a single-layered structure of Cr and a multi-layered structure of Cr/CrxOy or CrxCy/Cr/CrxCy are excellent in property of adhesiveness, property of light shielding and altitude to etching.

(2) Next, a resist 13 is coated on the light shielding layer 12. Typically, the layer of resist 13 having a thickness of about 0.5 micron can be obtained by coating the light shielding layer 12 with a positive type photoresist AZ1350/SF produced by Hoechet AG in accordance with a spin coating process performed at 3,000 rpm for 60 seconds and then prebaking the coated layer at a temperature of 85° C. for 20 minutes (see FIG. 2(b)).

In addition, an electron beam exposing resist, e.g., OEBR series positive type resist produced by Tokyo Oka Kogyo Co., Ltd. can be used also. In practice, a resist OEBR-1030 is coated at 3000 rpm for 60 seconds in accordance with the spin coating process and the coated layer is prebaked at a temperature of 170° C. for 30 minutes. Consequently, the resist layer having a thickness of about 0.3 micron is built.

(3) Next, a light beam 14 (ultraviolet ray) is radiated so as to allow a preformatting pattern 15 to be exposed to the light beam 14. As an exposing apparatus, Model NO. LZ-340 exposing apparatus produced by NSK Co., Ltd. can be used in order that exposure is achieved under a condition of 180 mj/cm$^2$. Inputting of data concerning the preformatting pattern 15 is effected by manual means, a magnetic tape or the like means each of which is used in association with CAD (see FIG. 2(c)).

As other type of electron beam exposing apparatus, Model NO. Mavis III exposing apparatus produced by Perkingson-Elmer Corporation can be used. In this case, it goes without saying that a resist for electron beam exposure is used for the purpose of exposing (4) Next, the layer of resist 13 is developed. The positive type photoresist AZ1350/SF produced by Hoechet AG can be developed in such a manner that it is immersed for 30 seconds in a solution using a developer AZ-312MIF produced by Hoechet AG diluted with pure water by a volumetric ratio of 1:1 and thereafter it is sufficiently washed using pure water (see FIG. 2(d)).

(5) Next, the light shielding layer 12 is subjected to etching. An etching solution having the following composition is used.

| | |
|---|---|
| ammonium cerium nitrate | 240 cc |
| perchloric acid (70%) | 60 cc |
| pure water | 1000 cc |

The light shielding layer 12 is immersed in the above etching solution at a temperature of 20° C. for 50 second so that it is subjected to etching. After completion of the etching operation, it is sufficiently washed using pure water (see FIG. 2(e)).

As a commercially available etching solution, Chrome etchant K (trade name) produced by Nagase & Co., Ltd. can be used too.

(6) Next, the resist 13 is removed. When the positive type photoresist AZ 1350/SF produced by Hoechet AG is removed, AZ thinner produced by the same company can be used. The hard mask blank 9 which has been subjected to etching is immersed in the AZ thinner for about 5 minutes. After the resist is dissolved therein, the mother mask is rinsed in a separate batch of AZ thinner and then it is dried (see FIG. 2(f)).

In a case where the resist OEBR-1030 produced by Tokyo Oka Kogyo Co., Ltd. is used, a removing liquid 502 produced by the same company is employable as a commerically available resist removing solution. The above liquid is heated up to a temperature of 100° C. and the hard mask blank 9 which has been subjected to etching is then immersed in the hot liquid for about 10 minutes so that the resist 13 is removed therefrom. After removal of the resist 13, the hard mask blank 9 is rinsed. A solution of mixture comprising acetone and methanol by a volumetric ratio of 1:1 can be used as a rinsing liquid.

(7) The mother mask 2 including a preformatting pattern 15 is completed by way of the aforementioned steps (see FIG. 2(g)).

Figure 3:
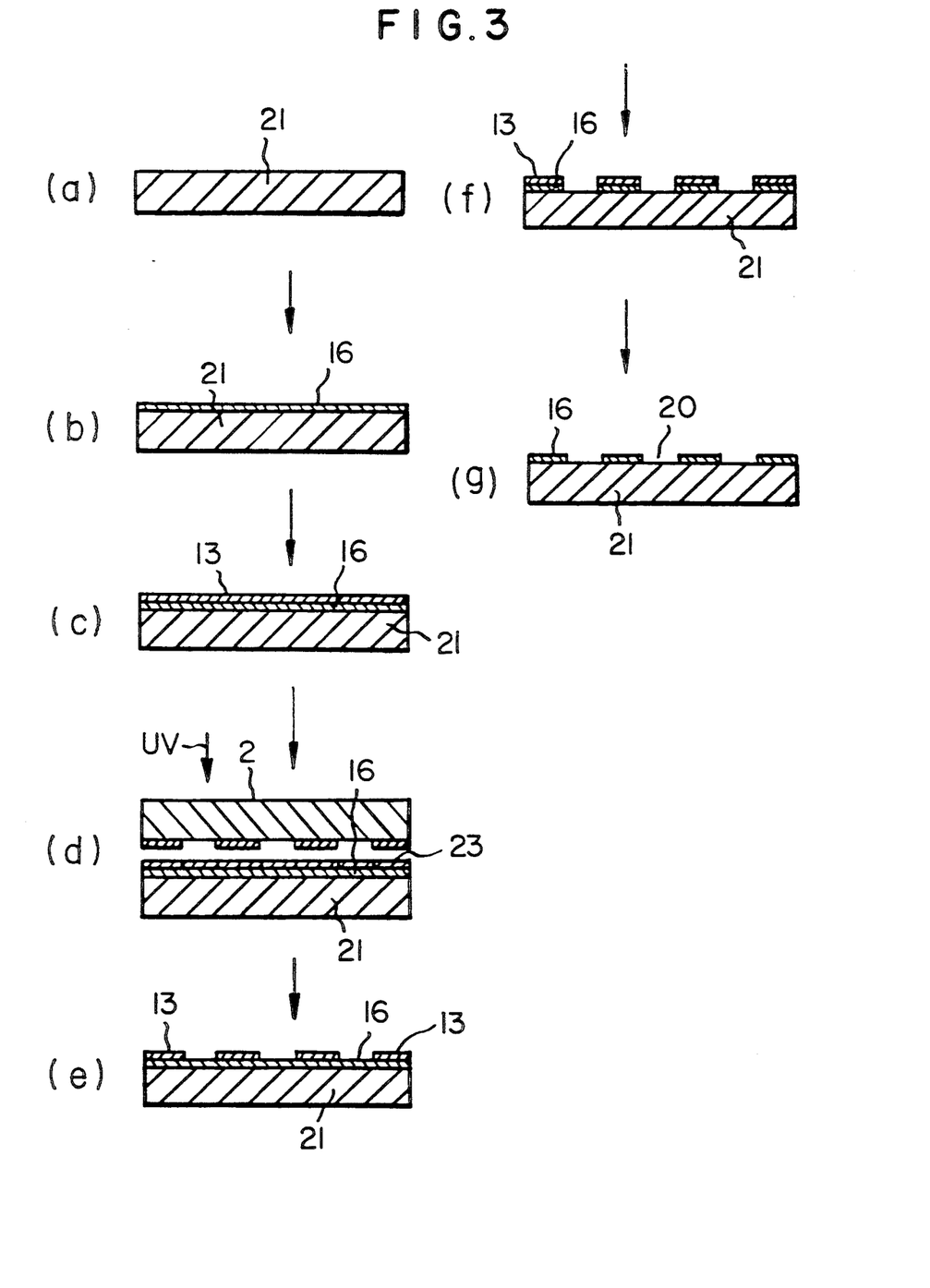

Thirdly, the present invention will be described below with reference to FIG. 3 which illustrates a series of steps of producing a master mask base board.

(1) First, a base board 21 is prepared (see FIG. 3(a)). The hard mask base board which has been described above with respect to the steps of producing the mother mask can be used for the base board 21.

(2) Next, a metal layer 16 is formed on the base board 21 (see FIG. 3(b)). The base board 21 is accommodated in a spattering apparatus of which inner pressure is reduced to a level of $1 \times 10^{-5}$ Torr. Then, an argon gas is introduced into the magnetron spattering apparatus so that an inner pressure is maintained at a level of $1 \times 10^{-3}$ Torr. With this apparatus, a layer of chromium having a thickness of about 700 angstroms is deposited on the base board 21 at a depositing rate of 10 angstroms per second. Consequently, the resultant metal layer exhibits a reflectivity in the range of about 50 to 60% within the region of near-infrared ray. Incidentally, the metal layer, the chalcogenide based metal layer and the alloy layer comprising the foregoing metal layers which have been used during the steps of producing the mother mask can be utilized for the metal layer 16. The present invention will be described further below with respect to an embodiment wherein a layer of chromium having a thickness of about 700 angstroms is used for the metal layer 16.

(3) Next, a resist 23 is coated on the metal layer 16 (see FIG. 3(c)). The resist which has been used during the steps of producing the mother mask can be used for the resist 23.

(4) Next, the mother mask 2 is superposed on the base board 21 in such a manner that the pattern surface of the former comes in close contact with the coated surface of the latter. Then, the superposed structure is exposed to a light beam emitted from a high pressure mercury lamp. Exposure is achieved under an exposing condition of 4 mJ/cm$^2$ (see FIG. 3(d)).

(5) Next, the resist 23 is developed (see FIG. 3(e)). The developing liquid which has been used during the steps of producing the mother mask can be used as a developing liquid.

(6) Next, the metal layer 16 is subjected to etching (see FIG. 3(f)). The step of etching permits the preformatting pattern 15 to be transcribed to the master mask base board 20 from the mother mask 2. The etching liquid which has been used during the steps of producing the mother mask can be utilized as an etching liquid.

(7) Next, the layer of resist 23 is removed from the master mask base board 20 whereby production of the latter is completed (see FIG. 3(g)). The removing liquid which has been used during the steps of producing the mother mask can be utilized as a removing liquid.

Figure 4:
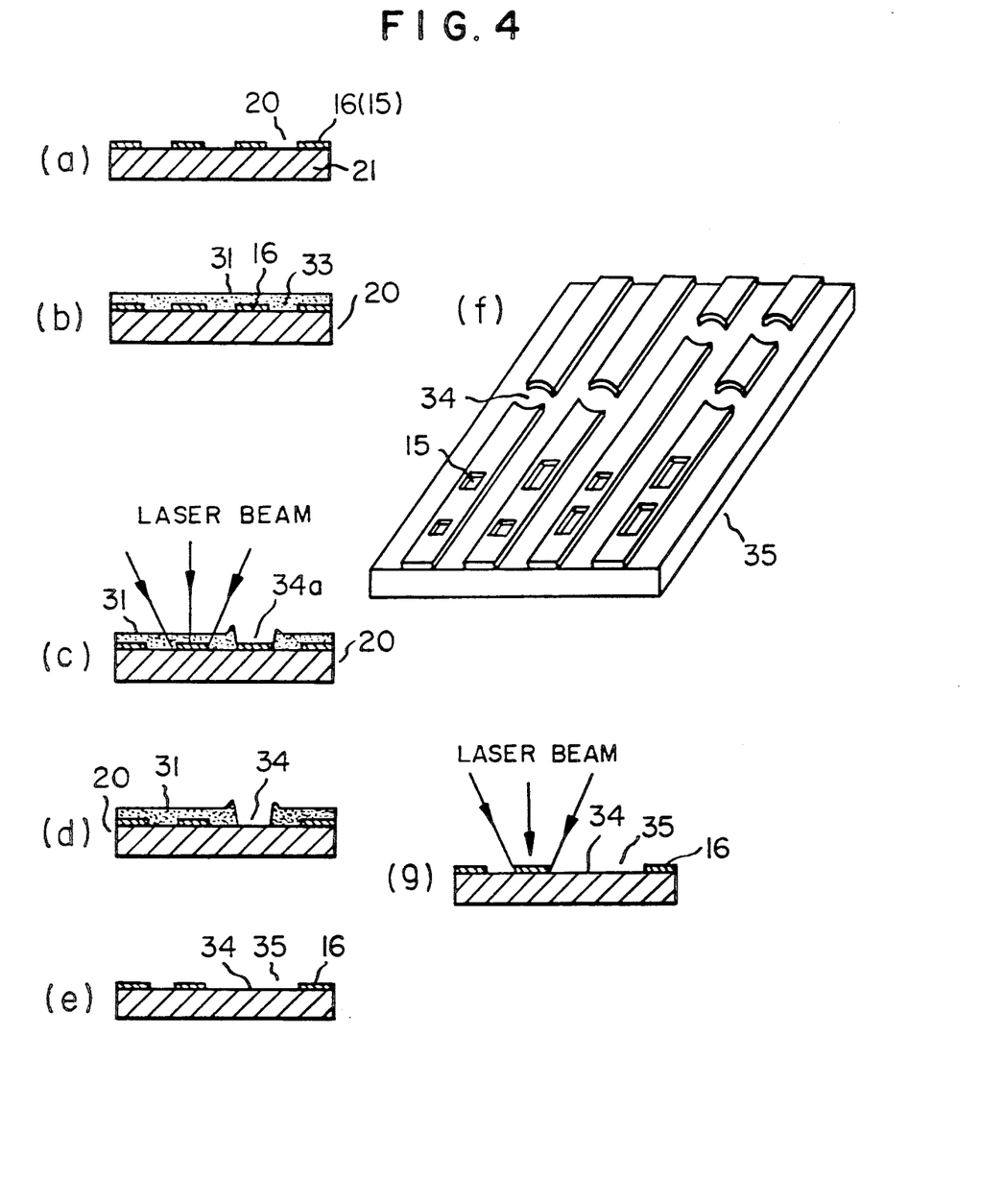

Fourthly, the present invention will be described further below with reference to FIG. 4 which illustrates a series of steps of producing a master mask.

(1) First, a master mask base board 20 is prepared (see FIG. 4(a)). The master mask base board 20 is such that the preformatting pattern 15 is transcribed thereto by way of the steps as shown in FIG. 3.

(2) Next, an optical recording layer 31 comprising dyestuff and resin is formed on the master mask base board 20 (see FIG. 4(b)). It is preferably that a compounding ratio of dyestuff to resin is set to a ratio of 1 of dyestuff to 1 of resin to assure an excellent property of resistance against an acid. With respect to the dyestuff, a material which is excellent in a property of writing ROM information data (representative of a material which is capable of excellently absorbing a writing laser light) is selected. On the other hand, with respect to the resin serving as a binder, a material which satisfactorily resists against the etching liquid during the step of etching is selected. For example, in a case where a semiconductor laser light having a wavelength of 830 nm is used as a writing laser light, a dyestuff liquid having the following composition is employed.

| | |
|---|---|
| infrared ray absorbing dyestuff IR-820 produced by Nippon Kayaku Co., Ltd. | 1 part |
| nitrosellose H1/8 produced by Taihei Chemicals Limited | 3 parts |
| cyclohexanone | 75 parts |
| 1,2-dichloroethane | 75 parts |

The dyestuff liquid which has been prepared by dispersing the above components therein in a mixed state is coated on the metal layer 16 by means of a spinner in accordance with a spin coating process performed at a rotational speed of 1,000 rpm for 60 seconds so that an optical recording layer 31 having a thickness of about 2,000 angstroms is produced. When it is assumed that the metal layer 16 (chromium layer) has an absolute reflectivity of 52% relative to near-infrared rays, reflectivities of the metal layer 16 and a glass portion 33 as seen from the surface of the optical recording layer 31 (surface representative of the dyestuff layer) are represented by about 17% and 5%, respectively. Consequently, when a semiconductor laser light having a wavelength of 830 nm is used, a sufficient contrast can be obtained. Since there is a possibility that a light interference occurs with the optical recording layer 31 and the metal layer 16 under circumstances, it is required that a thickness of the optical recording layer 31 is properly selected in dependence on the kind of resin, the kind of dyestuff, the ratio of resin to dyestuff in composition and the material used for the metal layer 16.

(3) Next, controlling for a tracking operation, a focussing operation and so forth is achieved on the basis of the preformatting pattern 15 which has been formed on the master mask base board 20 and ROM information data are encoded using a writing/reading apparatus for writable type optical recording cards so that the encoded information data are written in the form of a data pit pattern 34a (see FIG. 4(c)). Writing of the ROM information data is effected while the master mask base board 20 is conveyed. In a case where a semiconductor laser beam having a wavelength of 830 nm is collected on a spot having a width of 5 microns, the optical recording layer 31 can be removed in the form of a number of spots by radiating thereto an energy having an intensity of 8 mW for 20 microseconds and the data pit pattern 34a can be formed on the master mask base board 20. The ROM information data to be written are such that they are expressed in the form of a manuscript prepared by a word processor, a program or a photographic manuscript. Then, the ROM information data are scribed in accordance with the format for the writable type optical recording cards, e.g., in such a manner that they are introduced into a MS-DOS file, each file is segmented by every 256 bites, inserting and arranging of data are performed so as to adapt to a format for the writable type optical recording cards, editing of user data such as producing of a directory or the like is effected using a microcomputor, a tracking operation and a focussing operation are performed in accordance with the preformatting pattern.

(4) Next, a data pit pattern 34 is formed on the master mask base board 20 by etching the data pit pattern 34a which has been recorded by writing the data concerning the ROM informations (see FIG. 4(d)). The etching liquid which has been used during the steps of producing the mother mask can be utilized as an etching liquid.

(5) Next, the remaining optical recording layer 31 is removed from the master mask base board 20 using a solvent (see FIG. 4(e)). An acetone is used for the solvent. The optical recording layer 31 can be removed from the master mask base board 20 by immersing it in the solvent for 10 seconds. Then, it is rinsed using another batch of acetone and thereafter it is dried.

(6) Thus, production of the master mask 35 is completed (see FIG. 4(f)).

(7) Incidentally, as required, the master mask 35 is inspected (see FIG. (g)).

Figure 5:
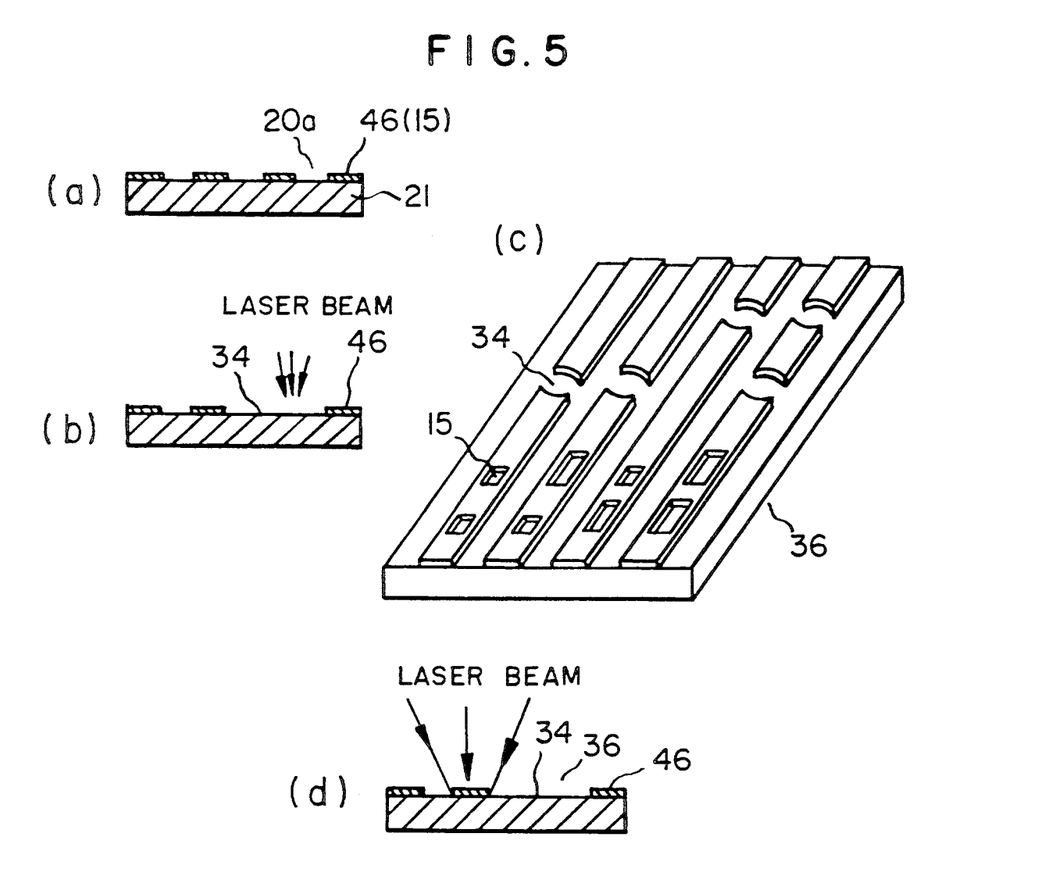

Further, the present invention will be described further below with reference to FIG. 5 which illustrates another series of steps of producing a master mask base board and a master mask.

(1) First, a master mask base board 20a is produced (see FIG. 5(a)). In practice, the master mask base board 20a is produced in such a manner that the metal layer of metal having a low melting point is used for the metal layer 16 during the step of producing the master mask base board 20a as shown in FIG. 3 and an etching liquid suitable for the metal layer of metal having a low melting point is used for the foregoing purpose. A chalcogenide based metal layer and an alloy layer comprising the metal layer of Al, Ni, Co, Ag, Au, Cu, Ti or the like and the chalcogenide based metal layer can be used for the metal layer 46 of metal having a low melting point. (It should be noted that an intermediate layer may be disposed between the base board 21 and the metal layer 46 of metal having a lower melting point in order to assure that a property of adhesiveness to the base board 21 and a sensitiveness during a period of writing using a laser beam are improved.) Here, description will be made below as to a case where a layer of Te having a thickness of 500 angstroms is used for the metal layer 46 of metal having a lower melting point. A layer of Te having a thickness of 500 angstroms has light reflexibility of about 65% and light transmissivity of 10% or less which is sufficient light shielding capability for mask. A single layer of Te can be formed on the base board 21 by employing conventional layer forming means in accordance with a spattering process or the like method. For example, an etching liquid having the following composition can be used for the master mask base board 20a which has been formed using the metal layer 46 of metal having a lower melting point.

| | |
|---|---|
| nitric acid | 1 part |
| hydrochloric acid | 1 part |
| phosphoric acid | 8 parts |
| pure water | 9 parts |

These components are mixed with each other by the above-noted ratio and the master mask base board 20a is immersed for about 30 seconds in the etching liquid which is held at a temperature of 20° C. so that the master mask base board 20a having the preformatting pattern 15 formed thereon is obtained.

(2) Next, ROM information data are encoded by a reading/writing apparatus for writable type optical recording cards while controlling for a tracking operation, a focussing operation or the like is performed using the preformatting pattern 15 on the master mask base board 20a and then writing of a data pit pattern 34 is effected (see FIG. 5(b)). ROM information data can be written in such a manner that a semiconductor laser beam having a wavelength of 830 nm is collected on a spot having a width of 5 microns and an energy having an intensity of 12 mW for 20 micron seconds is radiated to the spot in the form of pulses so that the data pit pattern 34 is formed directly on the master mask base board 20a.

(3) Thus, production of the master mask 36 is completed (see FIG. 5(c)).

(4) Incidentally, as required, the master mask 36 is inspected with respect to its pattern using the writing/reading apparatus for writable type optical recording cards (see FIG. 5(d)).

A working mask 60 (not shown) can be produced using master masks 35 and 36 by way of the same steps as those of producing the master mask base board. As required, the working mask 60 is inspected.

Next, description will be made below as to a method of producing optical recording cards each including an optical recording medium which has been produced using the working mask 60 of the present invention.

Figure 7:
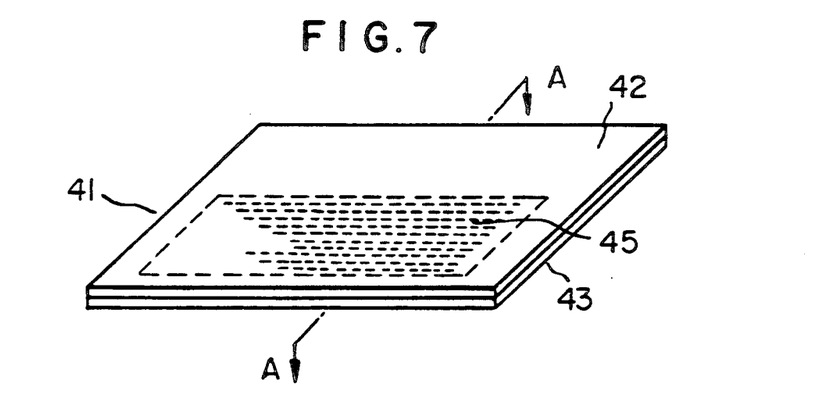
FIG. 7 is a perspective view illustrating a ROM type optical recording card.
Figure 8:
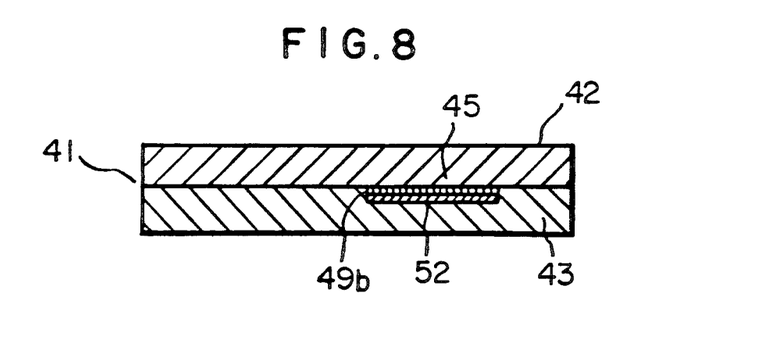
FIG. 8 is a cross-sectional view of the ROM type optical recording card taken in a line A—A in FIG. 7, and FIGS. 9(a) to (l) are a schematic view illustrating a step of producing a ROM type optical recording card using a working mask, respectively.

In FIGS. 7 and 8, reference numeral 41 designates a ROM type optical recording card. The ROM type optical recording card 41 is so constructed that an optical recording portion 45 is interposed between two card base baords, i.e., between a front card base board 42 and a rear card base board 43. The front card base board 42 is made in the form of a plate of transparent resin having an excellent flatness such as polycarbonate, polymethylmethacrylate, epoxy or the like resin material. On the other hand, the rear card base board 43 is made also in the form of a plate of resin such as polyvinyl chloride, polycarbonate, polyethyleneterephthalate or the like resin material.

The working mask 60 which has been produced in accordance with the present invention is used to form the optical recording portion 45.

Next, description will be made below as to a method of producing ROM type optical recording cards.

Figure 9:
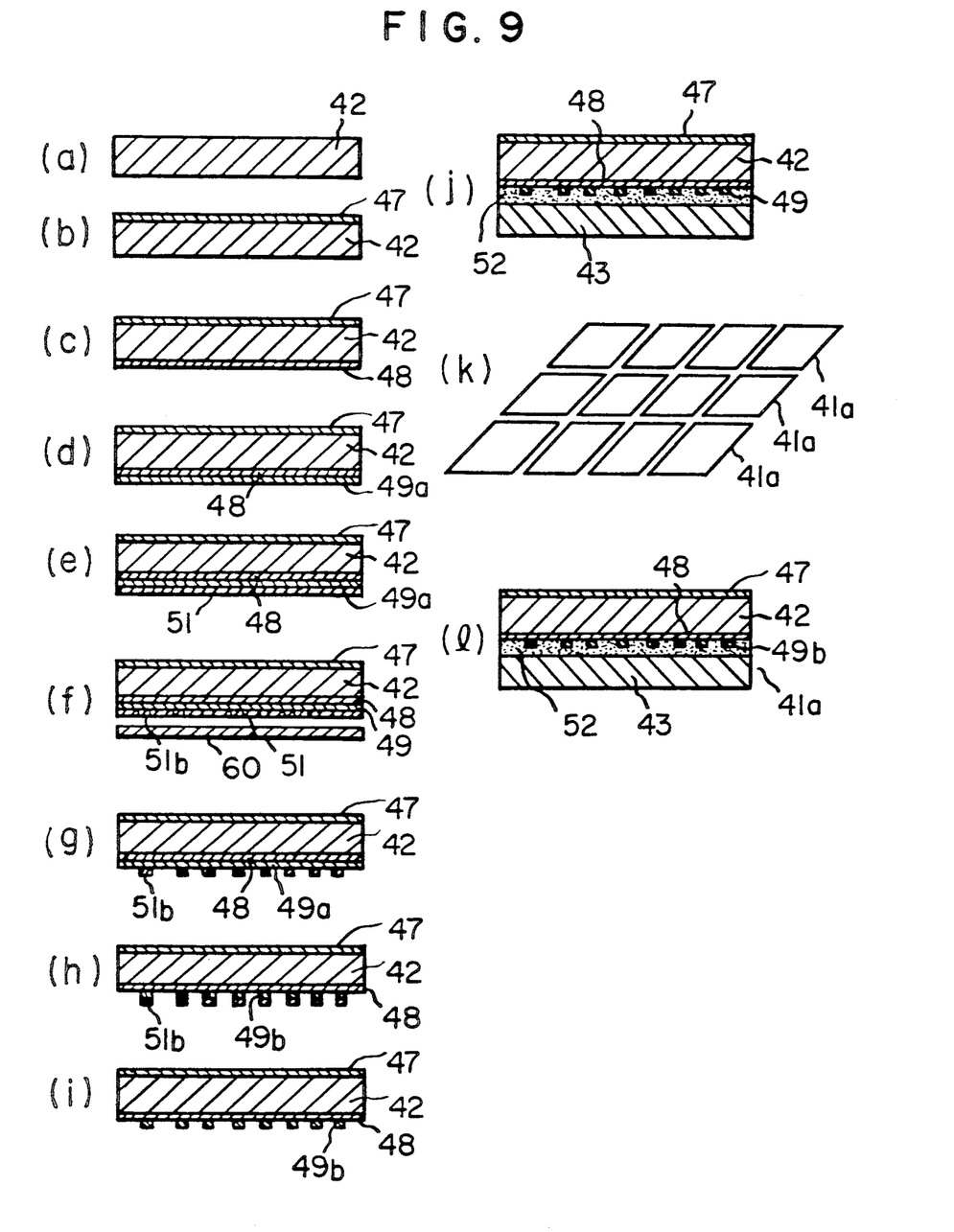

First, a method of producing a ROM type optical recording cards 41a by producing an information pattern on the front card base board 42 using a metallic reflective layer (indicative of an aluminum layer 49a) is as shown in FIG. 9.

(1) First, as shown in FIG. 9, a transparent front card base board 42 of polycarbonate having a thickness of 0.40 mm is prepared (see FIG. 9(a)).

(2) Next, acryl-silicon resin 1161 produced by Dainippon Ink & Chemicals Limited is coated over the outer surface of the front card base board 42 in accordance with a roll coating process so that a dried layer having a thickness of about 5 microns is obtained. Consequently, a hard coated layer 47 is formed (see FIG. 9(b)).

(3) Next, acryl-silicon resin 1161 produced by the same company is coated over the inner surface of the front card base board 42 in accordance with a roll coating process so that a dried layer having a thickness of about 5,000 angstroms is obtained. Thus, an anchor layer 48 is formed (see FIG. 9(c)).

(4) Next, an aluminum layer 49a is formed over a region corresponding to the optical recording portion 45 on the front card base board 42 in a vacuum deposition process performed at a deposition rate of 20 angstroms per second under a degree of vacuum represented by $2 \times 10^{-5}$ Torr so that the deposited layer having a thickness of about 1,000 angstroms is obtained (see FIG. 9(d)).

(5) Next, a photoresist Microposit (registered trademark) S1400-17 produced by Shipley Far East Ltd. is coated over the aluminum layer 49a on the front card base board 42 by operating a spinner at a rotational speed of 3,000 rpm for 30 seconds so that the dry coated layer having a thickness of about 5,000 angstroms is obtained. Thereafter, the coated layer is prebaked at a temperature of 90° C. for 15 minutes. Thus, a resist layer 51 is formed (see FIG. 9(e)).

(6) Next, a working mask 60 having a required data pit pattern (representative of ROM information data) formed thereon is caused to come in close contact with the resist layer 51 on the front card base board 42. Then, the assembled structure is exposed to light beam under a condition of 4 mJ/cm² using a mercury lamp so that an optical recording pattern layer 51b is formed (see FIG. 9(f)).

(7) Next, the resist layer 51 on the front card base board 42 is developed for 30 seconds using a developing liquid which is prepared by diluting a developing liquid MF-312 produced by Shipley Far East Ltd. with pure water at a ratio of one part of the former to one part of the latter. Thereafter, it is sufficiently washed with pure water and then it is dried (see FIG. 9(g)).

(8) Next, an etching solution having the following composition is prepared in a mixed/stirred state.

|  | (volumetric part) |
| --- | --- |
| phosphoric acid | 16 parts |
| acetic acid | 2 parts |
| nitric acid | 1 part |
| pure water | 1 part |

The aluminum layer 49a on the front card base board 42 is immersed in the foregoing etching solution at a temperature of 35° C. for 50 seconds using an optical recording pattern layer 51b as a mask so that it is subjected to etching. After an aluminum pattern 49b is formed, it is washed with pure water and then it is dried (see FIG. 9(h)).

(9) Next, to assure that a property of removal of the photoresist on the front card base board 42 is improved, the latter is exposed to a light beam again under a condition of 100 mJ/cm² and it is immersed for 1 to 2 seconds in a solution which is prepared by diluting a removing liquid (HAKURIEKI 10 -trade name-) produced by Tokyo Oka Kogyo Co., Ltd. with pure water at a ratio of one part of the former to 3 parts of the latter so that the optical recording pattern layer 51b is removed from the front card base board 42. Immediately after removal of the optical recording pattern layer 51b, the front card base board 42 is sufficiently washed with pure water and then it is dried (see FIG. 9(i)).

(10) Next, a layer of adhesive 52 comprising an urethane based thermoplastic adhesive is previously coated over the inner surface of the rear card base board 43 in the form of a sheet of polyvinyl chloride having a thickness of 0.35 mm in accordance with a roll coating process until the resultant dried layer has a thickness of 5 microns. Then, the inner surface of the front card base board 42 is brought in close contact with the inner surface of the rear card base board 43 in a superposed state. Thereafter, they are adhered to each other by subjecting them to hot pressing at a temperature of 90° C. for 10 minutes under the effect of pressure of 15 Kg/cm² (see FIG. 9(j)).

(11) Next, the resultant structure is cut to sizes corresponding to the configuration of an ordinary card (see FIG. 9(k)).

(12) Thus, production of the optical recording card 41a is completed (see FIG. 9(l)).

INDUSTRIAL APPLICABILITY

The present invention has provided a method of producing a plurality of masks for ROM type optical recording cards wherein a preformatting pattern (representative of a logical structure for reading and writing data) in the form of a control pit, a guide or the like for ROM type optical recording cards and writable type optical recording cards is identical to a data pit. According to the present invention, a writing/reading apparatus for writable type optical recording cards can be utilized as an inspecting instrument for inspecting a mother mask, a master mask and a working mask for ROM type optical recording cards as well as an inspecting instrument for inspecting the ROM type optical recording cards with the result that an inspecting operation during a step of producing these masks as well as an inspecting operation during a step of producing the cards can easily be performed without any necessity for exclusively designed inspecting instrument. Other advantageous effects of the present invention are that a system (representative of a data processing system comprising a computor, outer memory units and so forth) employable for a writing/reading apparatus for writable type optical recording cards can be utilized as a scriber for ROM information data and the system employable for the writing/reading apparatus for writable type optical recording cards can be utilized as a system employable for a reading apparatus for ROM type optical recording cards.

Owing to the aforementioned advantageous effects of the present invention, a cost required for producing a master mask can be reduced remarkable and steps of producing masks from the step of producing a mother mask to the step of producing a working mask can be simplified. In addition, it becomes possible to quickly meet the requirement for producing many kinds of ROM type optical recording cards in small production lot. Further, a cost required for producing the ROM type optical recording cards can be reduced substantially.

In this manner, according to the method of producing a plurality of masks for ROM type optical recording cards in accordance with the present invention, since a preformatting pattern (representative of a logical structure for reading and writing data) for ROM type optical recording cards and writable type optical recording cards in the form of a control pit, a guide or the like is used in common with a data pit, ROM type optical recording cards produced using the masks which have been produced in accordance with the method of producing a plurality of masks for ROM type optical recording cards permit ROM information data to be processed using a system for a reading/writing apparatus employable for writable type optical recording cards. Thus, masks for ROM type optical recording cards can simply be produced at an inexpensive cost. Further, according to the present invention, since a preformatting pit and a data pit are not scribed on a hard mask blank in response to every ROM information data on the basis of specifications set for these cards but ROM information data are scribed using a system for a reading/writing apparatus employable for writable type optical recording cards on the assumption that a mother mask including a preformatting pattern (representative of a logical structure for reading and writing data) for writable type optical recording cards in the form of a control pit, a guide or the like is produced and a master mask adapted to scribe ROM information data on the basis of the mother mask is prepared for every specification set for the cards, steps of producing a plurality of masks from the step of producing a mother mask of the step of producing a master mask can quickly be performed at an inexpensive cost.

What is claimed is:

1. A method of producing a working mask for ROM type optical recording cards each having the same preformatting pattern and data pit pattern as writable type optical recording cards comprising steps of;
    producing a mother mask having said preformatting pattern,
    producing a master mask base board on which said preformatting pattern is transcribed,
    producing a master mask by forming a number of pits on said master mask base board in correspondence to said data pit pattern by irradiating a laser beam thereto in response to a control signal derived from said preformatting pattern, and
    printing said master mask to produce said working mask.

2. A method of producing a mother mask for ROM type optical recording cards each having the same preformatting pattern as writable type optical recording cards comprising steps:
    coating a resist on a hard mask blank,
    next, exposing said resist to a light beam in accordance with the configuration of the same preformatting pattern as said writable type optical recording cards,
    next, developing said resist,
    next, etching said hard mask blank, and
    next, removing the resist from said hard mask blank.

3. A method of producing a master mask for ROM type optical recording cards each having the same preformatting pattern and data pit pattern as writable type optical recording cards comprising:
    coating a resist on a master mask base board having a metal layer formed thereon,
    next, exposing said resist to a light beam while a mother mask for ROM type optical recording cards each having the same preformatting pattern as said writable type optical recording cards is superposed on the resist,
    next, developing the resist,
    next, etching said metal layer on said master mask base board,
    next, removing the resist from the master mask base board,
    next, forming an optical recording layer on the metal layer of the master mask base board,
    next, writing said data pit pattern by forming a number of data pits on said optical recording layer in correspondence to the data pit pattern by irradiating a laser beam thereto in accordance with the same preformatting pattern as the writable type optical recording cards,
    next, etching the master mask base board using as a mask the optical recording layer with said data pits formed thereon in correspondence to the data pit pattern, and
    next, removing the optical recording layer from the master mask base board.

4. A method of producing a master mask for ROM type optical recording cards each having the same preformatting pattern and data pit pattern as writable type optical recording cards comprising steps;
    coating a resist on a master mask base board having a metal layer of metal having a low melting point formed thereon,
    next, exposing said resist while a mother mask for ROM type optical recording cards each having the same preformatting pattern as said writable type optical recording cards is superposed on the resist,
    next, developing the resist,
    next, etching said metal layer of metal having a low melting point formed on said master mask base board,
    next, removing the resist from the master mask base board, and
    next, writing said data pit pattern by forming a number of data pits on the metal layer of metal having a low melting point in correspondence to the data pit pattern by radiating a laser beam thereto in accordance with the same preformatting pattern as said writable type optical recording cards.

5. A method of inspecting a plurality of masks each having the same preformatting pattern and data pit pattern as writable type optical recording cards, wherein said data pit pattern for said masks is read by a reading/writing apparatus for inspecting the masks while the reading/writing apparatus for said writable type optical recording cards is controlled in response to a control signal derived from said preformatting pattern, and decoded ROM information data are compared with ROM information data prepared on the basis of specifications set for said ROM type optical recording cards using a computor.

6. The method as claimed in claim 5, wherein said masks comprise a mother mask for ROM type optical recording cards, a master mask and a working mask.

7. A method of inspecting ROM type optical recording cards each having the same preformatting pattern and data pit pattern as writable type optical recording cards, wherein said data pit pattern for said ROM type optical recording cards is read by a reading/writing apparatus for inspecting the ROM type optical recording cards while the writing/reading apparatus for said writable type optical recording cards is controlled in response to a control signal derived from said preformatting pattern, and decoded ROM information data are compared with ROM information data prepared on the basis of specifications set for said ROM type optical recording cards using a computor.

* * * * *